C. J. CRANE.
Spoke-Socket.
No. 50,655.                                      Patented Oct. 24, 1865.
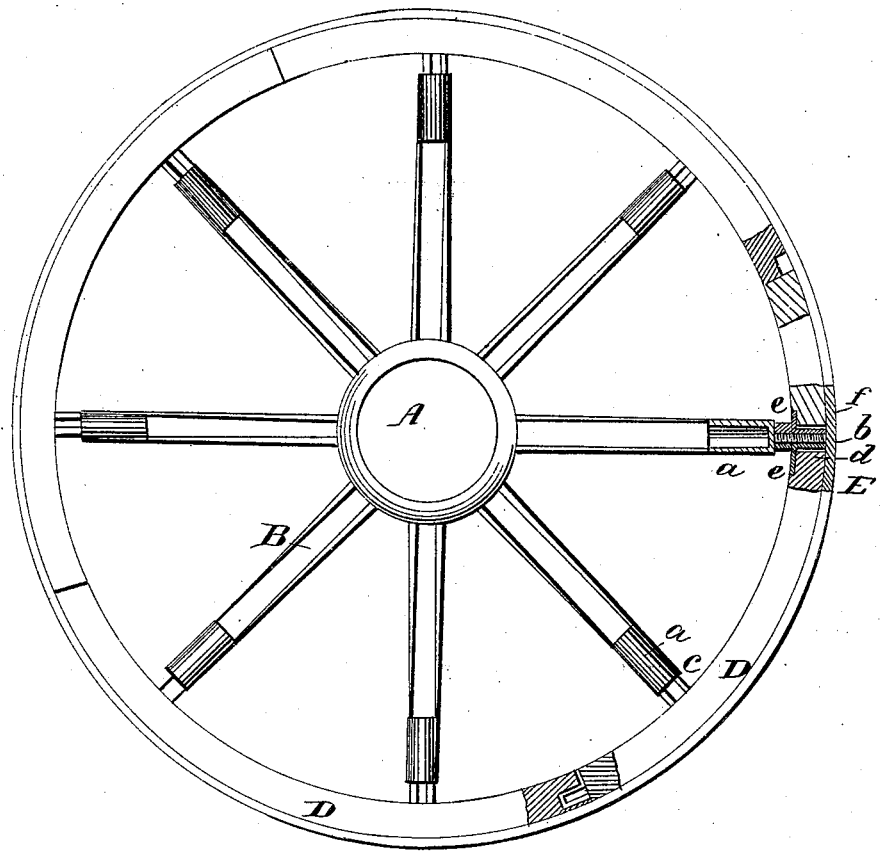
Witnesses
Wm Drewrn
Theo Tusch
Inventor
C. J. Crane
By Munn & Co
attys

UNITED STATES PATENT OFFICE.

C. J. CRANE, OF BURR OAK, MICHIGAN, ASSIGNOR TO J. F. CRANE, OF SAME PLACE.

IMPROVED WHEEL FOR AXLES.

Specification forming part of Letters Patent No. 50,655, dated October 24, 1865.

*To all whom it may concern:*

Be it known that I, C. J. CRANE, of Burr Oak, in the county of St. Joseph and State of Michigan, have invented a new and useful Improvement in Wheels for Vehicles; and I do hereby declare that the following is a full, clear, and exact description thereof, which will enable those skilled in the art to make and use the same, reference being had to the accompanying drawings, forming part of this specification.

The drawing represents a side view of my invention partly in section.

The tires of the wheels of vehicles are very liable to become loose, owing to the shrinking of the fellies of the wheel and the hub, and more frequently to the penetration of the ends of the spokes into the fellies and hub. When the tire of a wheel becomes loose from either of the above causes it has hitherto been the custom to remove the tire, and either cut it and reweld it and shrink it again on the wheel, or to contract the tire without cutting it by upsetting with a machine, many of which are patented for that purpose. Both of these plans are attended with considerable trouble and expense, which it is the object of my invention to avoid.

My invention consists in applying to the spokes of a wheel a nut and sleeve and a screw, arranged in such a manner that the spokes may be expanded or lengthened at will and the tire always kept tightly on the wheel.

A represents the hub, B the spokes, and D the fellies, of a wheel. The hub and fellies possess no novelty, and the inner ends of the spokes are provided with tenons fitted in mortises in the hub, as usual. On the outer end of each spoke there is fitted a metal cap, $a$, the exterior of which is flush with exterior of the spokes, the inner ends of the caps fitting against shoulders on the spokes. These caps are provided with screw-rods $b$, on which nuts $c$ and sleeves $d$ are fitted. These nuts and sleeves are in one piece and have an internal screw-thread extending entirely through both, the sleeves being formed of cylindrical portions which pass into the fellies, and the nuts having a square or polygonal exterior to receive a wrench when necessary. The inner ends of the nuts bear against the outer ends of the caps $a$, and the outer ends of the former bear against metal flanges $e$ at the inner ends of thimbles $f$, which are fitted in holes in the fellies, the sleeves $d$ being fitted in the thimbles.

The tire E is shrunk on the wheel as usual, and in the case of the tire becoming loose at any time from either of the causes previously named, it may be tightened by turning the nuts by means of a wrench applied to the nuts, the outer ends of the latter bearing against the fellies and virtually lengthening their spokes in case the latter are shortened by their ends being forced into the hub, or extending the fellies in case the latter are shrunk.

I claim as new and desire to secure by Letters Patent—

The combination of the spoke, cap $a$, and screw-rod $b$ with the thimble $f$, flange $e$, and nut $d$, arranged and operating as and for the purpose described.

C. J. CRANE.

Witnesses:
C. EDW. THORNTON,
O. L. COWLES.